(12) United States Patent
Greenhill

(10) Patent No.: US 6,254,071 B1
(45) Date of Patent: Jul. 3, 2001

(54) SINGLE-TURN, ROUND WIRE WAVE SPRING

(75) Inventor: Michael Greenhill, Highland Park, IL (US)

(73) Assignee: Smalley Steel Ring Company, Wheeling, IL (US)

( * ) Notice: Subject to any disclaimer, the term of this patent is extended or adjusted under 35 U.S.C. 154(b) by 0 days.

(21) Appl. No.: 09/467,468

(22) Filed: Dec. 20, 1999

(51) Int. Cl.[7] ................................. F16F 1/20; F16F 1/18
(52) U.S. Cl. ..................... 267/161; 267/158; 267/162; 267/166
(58) Field of Search ..................... 267/161, 162, 267/158, 180, 181, 182, 164, 286, 166, 170, 179, 167, 163, 85, 80, 86; 411/521, 160, 545; 403/326

(56) References Cited

U.S. PATENT DOCUMENTS

| | | |
|---|---|---|
| 101,724 | 4/1870 | French . |
| 361,298 | 4/1887 | Kilmer . |
| 1,523,225 | 1/1925 | Lukens . |
| 1,862,992 | 6/1932 | Vargha . |
| 2,458,118 | 1/1949 | Tursky . |
| 2,607,582 | 8/1952 | Jurgens . |
| 3,246,075 | 4/1966 | Dansard . |
| 3,263,982 | 8/1966 | Kersavage . |
| 4,114,905 | 9/1978 | Mercier . |
| 4,120,489 | 10/1978 | Borlinghaus . |
| 5,253,507 | 10/1993 | Lycan . |
| 5,558,393 * | 9/1996 | Hawkins et al. ............ 267/148 |
| 5,639,074 * | 6/1997 | Greenhill et al. ............ 267/162 |
| 6,068,250 * | 5/2000 | Hawkins et al. ............ 267/148 |

* cited by examiner

Primary Examiner—Douglas C. Butler
(74) Attorney, Agent, or Firm—Vedder, Price, Kaufman & Kammholz

(57) ABSTRACT

A round wire wave spring is formed from a single turn of round wire with a plurality of distinct waves defined therein, each of the waves having respective crest and trough portions that bear against opposing parallel surfaces of two work elements. The round wire wave spring may fit in a simple to form semi-circular groove, that is slightly greater in diameter than the free diameter of the round wire wave spring.

19 Claims, 5 Drawing Sheets

SINGLE-TURN, ROUND WIRE WAVE SPRING

BACKGROUND OF THE INVENTION

The present invention relates generally to wave springs, and more particularly, to single-turn, round wire wave springs of circular cross-section that offer a variety of advantages over current flat wire wave springs.

Springs take many forms in the art. Some compression springs are made in a conventional manner in which a metal wire is wrapped around a mandrel in a spiral fashion to form a plurality of spring turns to form a spring of a desired length. These ordinary compression springs were not suitable for all purposes. Flat wire wave springs were developed in response for the need for specialty springs and were designed using flat wire to reduce the free height and operating height of a spring that was necessary to generate an appropriate spring force for a given application. Many such flat wire wave springs were developed for specialized applications. One example of such a wave spring is described in U.S. Pat. No. 4,901,987 issued Feb. 20, 1990 to the assignee of the present invention, in which a crest-to-crest wave spring is provided with circular flat end portions. The flat end portions permit the spring to seat better in its applications and the crest-to-crest arrangement provides for a softer and more precise spring rate.

Although the use of crest-to-crest wave springs in applications dictating higher force and deflection over the single turn flat wire wave spring, such springs are somewhat complicated and expensive to produce. Moreover, such springs require both greater free heights and operating heights which often negate their use in certain work applications. Additionally, the edge winding process has a tendency to possibly introduce an overall irregular, trapezoidal cross-sectional configuration shape that is difficult to maintain in its work position.

Other problems that may occur in flat wire, edge-wound wave springs involve the occasional production of deformed wave springs. Edge-winding of wave springs is a complex process that requires bending a flat wire about its longest cross-sectional axis, that is the full length of the flat wire is wound around a mandrel. This bending may sometimes cause compressive buckling along the interior edge of the flat wire, which is closest to the surface of the mandrel. Likewise, the exterior edge of the flat wire undergoes tension and often the exterior edge experiences a tensioning weakening along its exterior edge.

As such, a need currently exists for an improved wave spring that is more easily formed without buckling and which is less expensive to produce than a flat wire wave spring.

The present invention is directed to an improved wave spring that overcomes the aforementioned disadvantages.

SUMMARY OF THE INVENTION

Accordingly, it is a general object of the present invention to provide an improved wave spring that is formed from a circular cross-section round wire having a lower material and production cost.

It is another object of the present invention to provide a round wire wave spring having only a single turn and including at least two full waves formed therein, each of the waves having a defined crest portion and a trough portion, the round wire cross-section increasing the mechanical reliability and lowering the operating stress of the spring.

It is another object of the present invention to provide a round wire wave spring with a single turn and having a plurality of waves formed therein, each wave having a crest portion and a trough portion, the waves having the same amplitude and frequency, the wave spring further having a generally circular extent with two free ends to thereby prevent the wave spring from expanding when compressed under load.

It is yet another object of the present invention to provide a wave spring formed from a single turn of round wire, and a plurality of waves formed therein, each of the waves having distinct crest and trough portions, the single turn having a generally circular extent and the spring turn being defined between two free ends of the spring, the round wire cross-section resulting in higher spring force per cross-sectional area units.

These and other objects of the present invention are achieved by the structure of the present invention in which a wave spring is provided having only a single turn formed from an extent of round wire. The round wire has a plurality of waves formed therein, with each of the waves having distinct crest and trough portions. The peaks of these crest and trough portions form bearing, or work surfaces, that lie along opposite operational working faces of the wave spring.

In the preferred embodiment, the spring has a discontinuous extent, having a gap between two free ends of the spring. This gap permits the spring to move under loading and prevents the spring from binding on a work element or creeping out of its groove.

Also in the preferred embodiment, at least three complete waves are formed, with each having a distinct crest and trough portion. In this manner, the peaks of the crests face and lie adjacent to an opposing first surface of a work element, while the peaks of the troughs face and lie adjacent to an opposing second surface of a work element. The three waves are spaced approximately equally around the circular extent of the wave spring so that the peaks thereof evenly support and bear against their opposing work elements. These waves may define wave patterns that are substantially sinusoidal and/or clothoidal in appearance.

In one application of the present invention, wave springs of the invention may be used in conjunction with a work element having a semi-circular groove formed therein. The groove receives the wave spring and the radius of the groove preferably matches or approximates that of the wire used to form the wave spring. The semi-circular groove is easier to cut than a completely flat groove as is needed with a flat wire spring, so that the ultimate cost of preparing work elements for use with such a spring is reduced. The walls of the groove and the curvature of the spring somewhat match in their configuration so that the spring is more positively supported in the groove, leading to lower operating stresses that occur during operation.

These and other objects, features, and advantages of the present invention will be clearly understood through a consideration of the following detailed description.

BRIEF DESCRIPTION OF THE DRAWINGS

In the course of the description, reference will be made to the attached drawings in which.

DETAILED DESCRIPTION OF THE INVENTION

Figure 1:
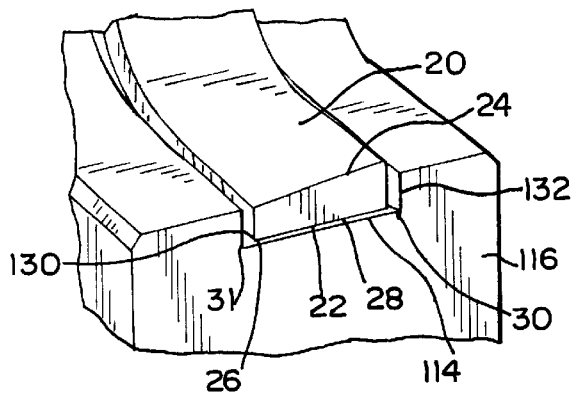
FIG. 1 is a perspective view of a prior art flat wire wave spring disposed in a rectangular groove.

FIG. 1 illustrates a known edge-wound, flat wire wave spring 20 in place within the groove 26 of a work element. This wave spring 20 is formed from flat wire into a spring shape having multiple turns, with the flat wire having a slightly trapezoidal cross-section. The lower surfaces 22 of the wave spring 20 (at the peaks of the trough portions thereof) lie flat in the rectangular groove 26 formed in the work element and against the lower surface 28 of the groove 26. The upper edge 24 of the spring 20 does not lie parallel to the lower edge 22 of the spring 20 because of the trapezoidal shape which the spring assumes. This upper edge 24 is not parallel to the lower edge, and therefore the flat wire wave spring 20 does not lie evenly in the groove 26 on the work element shown and the wave spring 20 will not bear evenly against an opposing work element (not shown) unless the wave spring has a large degree of torsion forces applied to it.

Figure 2:
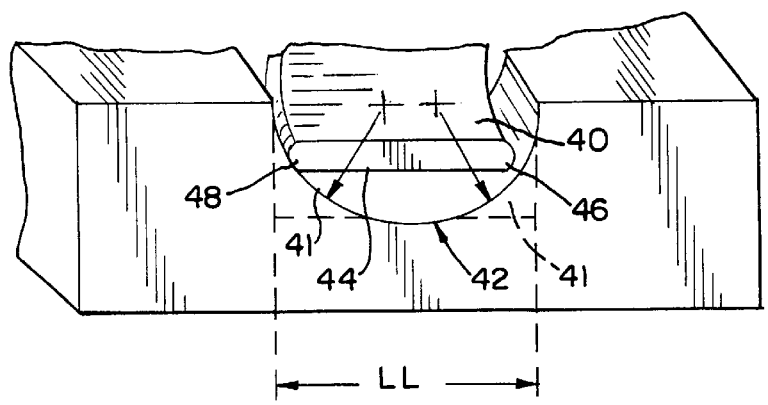
FIG. 2 is an enlarged detail view of the flat wire wave spring of FIG. 1, but illustrated disposed in an arcuate groove.

FIG. 2 illustrates another problem encountered in the prior art with flat wire wave springs. When forming the rectangular groove 26 in a work element, as shown in FIG. 1, the cutting head of the tool that forms the groove 26 may dull slightly over time. This dulling occurs at the edges of the cutting tool. If this dulling is not caught by a machinist, it results in the forming of an out of tolerance groove in which the areas that should be sharp corners, wind up to be slightly rounded, such as shown at 41 in FIG. 2.

The rounded configuration of these corners 41 of the groove 42 will prevent the wave spring 40 from seating properly within the groove. The wave spring 40 will contact the groove at only two points 46 and 48, instead of across entire lower edge 44 of the wave spring 40 as is intended by the spring designer. This will result in a high stress concentration being placed on wave spring 40 and on the groove 42. Additionally, the wave spring 40, as illustrated, will not properly seat in the groove 42, and the wave spring may not attain its design free height, and the actual operating height of the wave spring 40 will also be different than its design value. If the groove 42 is over cut, i.e., it is wider than the width of the spring wire, the wave spring 40 will sit flat on the planar base portion, rather than on the rounded corners 41 and the wave spring 40 may creep or otherwise move upwardly along the contour of the groove 42 and up the rounded corners 41 thereof, thereby causing misalignment of the spring. This may lead to problems when the spring no longer operates at its designed working height because the spring load will increase. Additionally, in its free state, the spring at its free height, if not resting on the bottom of the groove 42, may have a working height greater than its design working height and leading to interference with other working elements.

Another problem that occurs with flat wire wave springs of the prior art when they do seat properly in a rectangular groove or move radially out of the groove, is that the wave spring is apt to ride out of the groove and separate from its intended work position, causing stoppage or problems with the working elements. Still another problem occurs with the working environment in that rectangular grooves as shown in FIG. 1 have large stress concentrations occurring in their corners 30, 31 partially because of the sharp cuts of the grooves.

Figure 3:
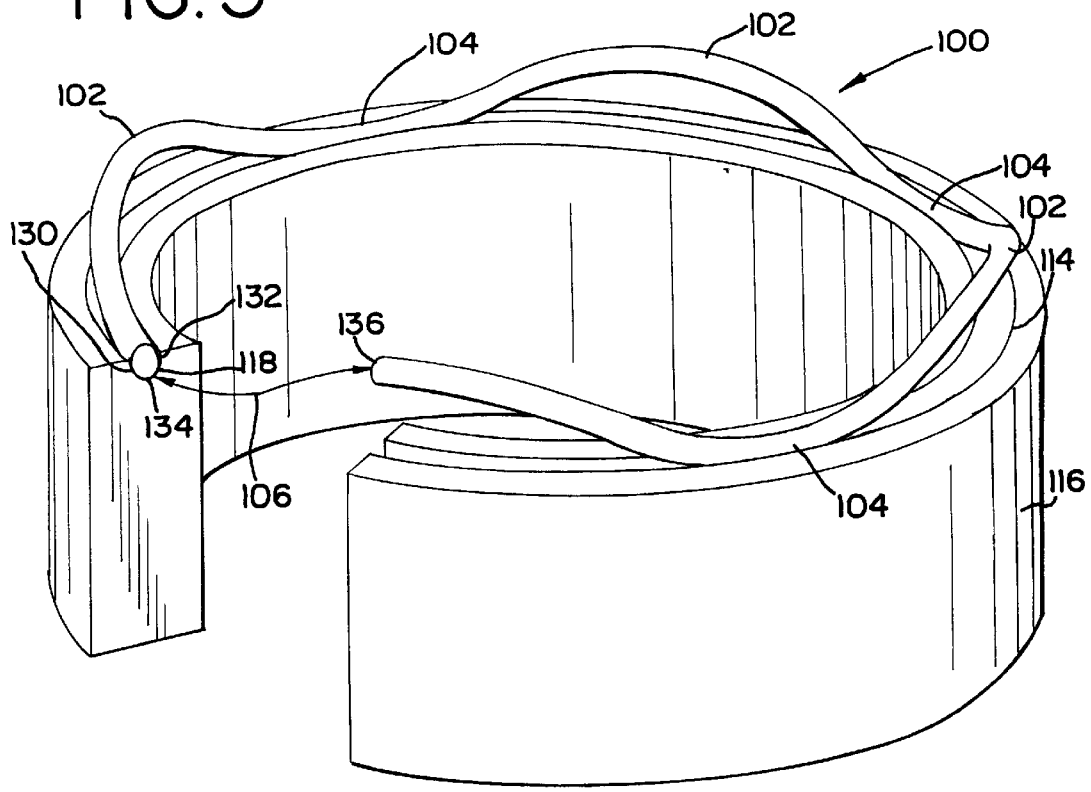
FIG. 3 is a perspective view of a round wire wave spring constructed in accordance with the principles of the present invention and illustrated within a round groove.

As mentioned above, the present invention provides a solution to these problems and overcomes the disadvantages of the prior art. Referring now to FIG. 3, a round wire wave spring constructed in accordance with the principles of the present invention is shown generally at 100. This spring is shown in a compression spring type application. The wave spring 100 is formed from an extent of round wire that is formed itself into almost one complete turn of wire. Preferably, the wire has a cross-section that is generally uniform throughout its length. A plurality of waves are defined in the turn, and each wave is defined by a crest portion 102 that rises upwardly and a trough portion 104 that descends downwardly. The crest and trough portions 102, 104 lie adjacent one another along the extent of the wave spring and include shoulder portions for contacting work elements. The waves have a generally sinusoidal or clothoidal path along the circumferential extent of the ring. The round wire wave spring 100 is discontinuous in its circular extent, and the turn terminates in two opposing free ends 134 and 136 of FIG. 5 that are separated by an intervening gap 106.

Figure 7A:
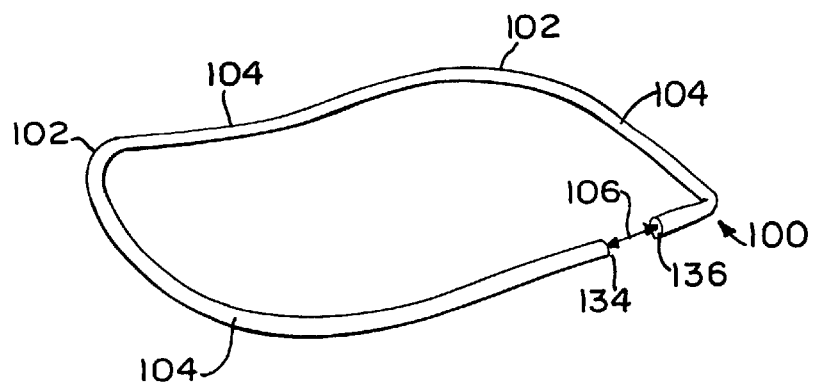
FIG. 7A is a perspective view of a third embodiment of a round wire wave spring in accordance with the principles of the invention and having three waves formed thereon.
Figure 7B:
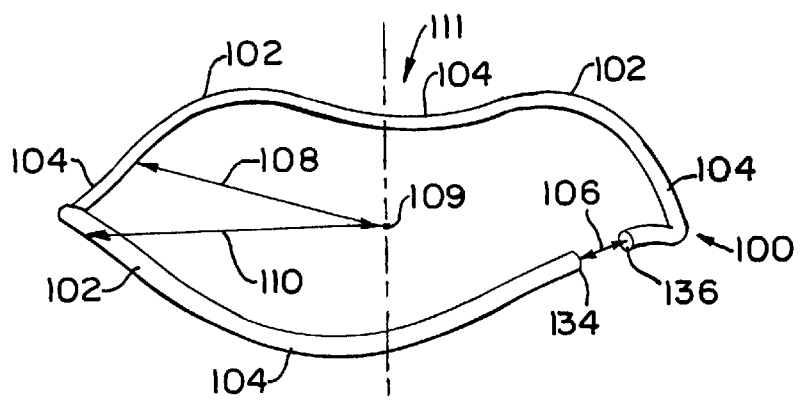
FIG. 7B is a perspective view of a fourth embodiment of a round wire wave spring constructed in accordance with the principles of the invention and having four waves formed thereon.

The wave spring 100 is formed by winding a length of such wire about a mandrel having a given diameter, as shown best in FIG. 7B. The wave spring 100 may be considered as having an interior radius 108 that runs along the interior circumferential surface of the spring when considered from a center 109 of the wave spring 100. The wave spring 100 also has an outer radius that runs along the outer circumferential surface of the spring. The distance between these two dimensions will usually be the diameter of the wire used in producing the wave spring.

Figure 6:
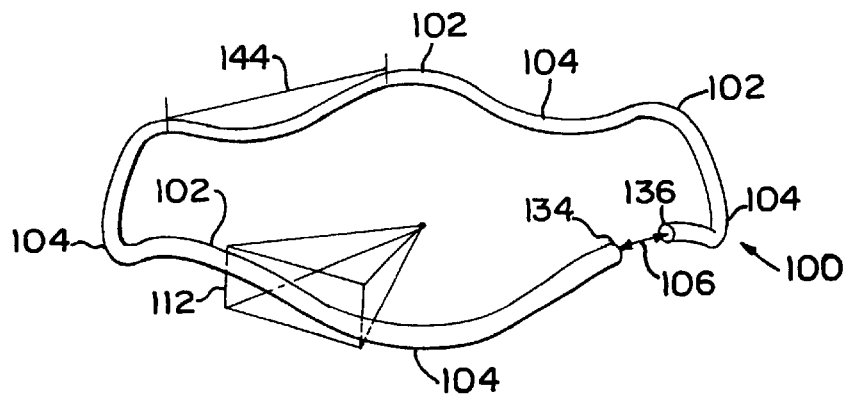
FIG. 6 is a perspective view of another embodiment of the present invention illustrating a round wire wave spring having five waves formed thereon.

As shown best in FIG. 6, each wave of the wave spring 100 has a preselected amplitude 112, which is defined as the difference in distance (or height) between the top peak of a crest 102 of the wave to the bottom peak of an adjacent trough 104 of the wave. This amplitude 112 corresponds to the normal and undeflected free height of the spring 100 which is the height of the spring when not loaded (or the vertical distance between adjacent crest and trough portions of a wave), while the term operating height, as used herein, refers to the height of the spring when loaded. Loading occurs when a work element contacts the wave spring. The weight of the work element typically is the load that is applied to the wave spring.

The distance between two successive crests defines a chord 144, shown in the drawings as an arc length or circumferential distance that is equal to the length of the wave. Preferably, the minimum wave length is 0.30 inches. In order to have a stable configuration, it is preferred that the wave spring 100 have at least about three complete, or full waves, meaning each such wave has its own defined wave crest and trough. With the preferred number of waves as set forth above, the peaks of these crests and troughs will be spaced in an equidistant manner about the circular extent (approximately 360°) of the wave spring 100 so that they will support the work element. These three waves are preferably located at intervals of about 120°. The loading will then be located at three points on each side of the spring, i.e., on shoulder portions on the crest portions and on shoulder portions on the trough portions and equally balanced throughout the circular extent of the wave spring.

Figure 4:
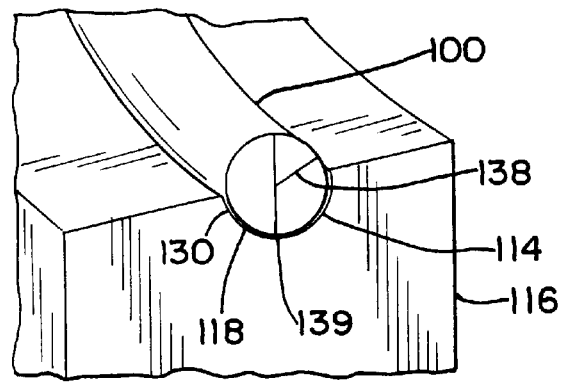
FIG. 4 is an enlarged detail view of the round wire wave spring of FIG. 3 illustrating how the spring seats within a semi-circular groove in a work element.

As shown in FIG. 4 and as is known in the art, the wire radius 138 of the wave spring 100 is one-half of the diameter 139 of the round wire. The diameter of the round wire is a parameter utilized by spring designers and is governed by several factors. One such factor is the relationship of the diameter to the spring force. The greater the diameter of the spring wire, the greater the spring force of the spring. Another factor, is the width or diameter, of the annular groove 114 formed in the support surface 116 of the work element. A designer may want to require the annular groove 114 to be no greater than a predetermined radial extent, or space. In order to properly seat the round wire wave spring 100 in the groove 114, the wave spring 100 must have a wire diameter no greater than two times the radius of the groove 114, i.e., it can be no larger than the actual width of the groove so that no localized binding or stress will occur in either the spring 100 or the groove 114. Preferably, the groove 114 has an approximate semi-circular cross section. However, the groove 114 may have other cross-sectional configurations including those of rectangles, ovals, or ellipses. In instances where the groove 114 has a semi-circular cross-section, stress concentrations that occur in square grooves (FIG. 1) are absent, or are significantly reduced.

Figure 10A:
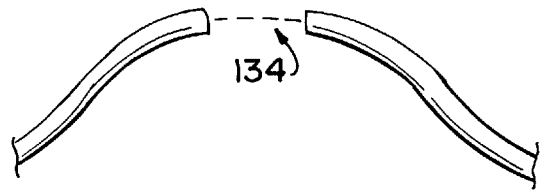
Figure 10B:
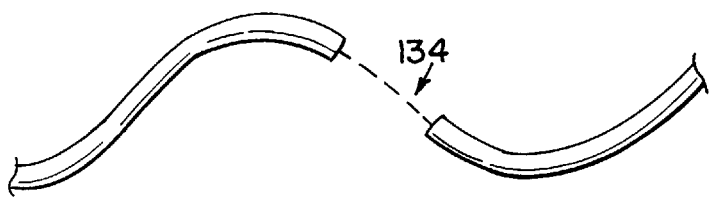
Figure 10C:
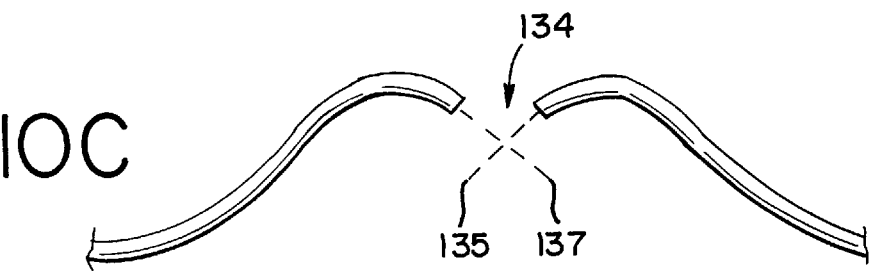

Referring back to FIG. 6, the wave spring 100 has a pair of free ends 134 and 136 that are spaced apart from each other by an intervening gap 106. This gap 106 may occur at various locations along the wave extent of the wave spring 100. It may occur in a location at or near the peak of a crest of a wave as shown in FIG. 6 where the free ends 134, 136 of the wave spring are axially aligned and opposed with each other as in FIGS. 6 and 10A. The intervening gap may also occur along the transition area in a wave path between the crest and trough portions thereof as shown in FIG. 10B. In this instance, the free ends will be aligned with each other. Additionally, it is contemplated that the free ends may occur at similar locations on two different waves, but of different frequencies, as is shown in FIG. 10C, where two adjacent waves crest peaks are shown and the free ends 134, 136 are not axially aligned with each other, but where the projected paths 135, 137 of the free ends 134, 136 intersect each other, are parallel to each other or askew of each other.

One significant advantage of the round wire wave spring 100 over the prior art flat wire wave spring is that the round wire wave spring of a given diameter will have superior spring force characteristics as compared to a similarly sized flat wire wave spring. The radial width of the groove in which any spring is a fixed parameter for a spring designer. The physical size of the spring is limited by that constraint. When a designer wants to support a larger load, the larger load may unduly increase the stress in a flat wire wave spring. The options of the designer are to: (1) stack additional springs on top of each other to support the load; (2) interlace two or more springs together; or (3) increase the thickness of the flat wire. The stacking solution infringes upon any height restrictions, while the interlacing increases the cost and complexity of the spring. Increasing the thickness of the wire may exceed any thickness to width radio restriction the designer may have.

The use for a circular cross-section by using round wire gives a spring designer greater flexibility in his design options. The circular cross-section of a round wire section gives a larger cross-sectional area than a flat wire section. It permits the designer to put more thickness into a radial width of a spring application. This results in what I describe in more detail below as a greater "power factor" for the spring.

Furthermore, when the thickness is increased, the material cost for the flat wire wave spring will exceed the material cost for the round wire wave spring. The cost of forming a rectangular groove for the flat wire wave spring seat is also greater than forming a rounded groove. Accordingly, it will be appreciated that in order to obtain the same spring force in a flat wire wave spring, a significant increase in cost is required.

To make a spring rate comparison, the spring rate formula for each spring cross-section is:

| Round Wire Wave Spring | Flat Wire Wave Spring |
| --- | --- |
| $\dfrac{0.3(E)(d^4)(N)(O.D.)}{(D_m^3)(ID)}$ | $\dfrac{E(b)(t^3)(N^4)(O.D.)}{(1.94)(D)(ID)}$ | where
E = Modulus of Elasticity
d = Wire Diameter
N = Number of Waves
O.D. = Outside Diameter
I.D. = Inside Diameter
Dm = Mean Diameter
b = Wire Width
t = Wire Thickness The difference in these two formulas is derived as being the moment of inertia for the specific cross-section configuration:

| Round Wire Wave Spring | Flat Wire Wave Spring |
| --- | --- |
| $\dfrac{\pi d^4}{64}$ | $\dfrac{bt^3}{12}$ |

For example, if an arbitrary groove width is selected for a wave spring having a groove width of 0.25 inches, assuming perfect ideal conditions, the round wire wave spring will have a wire diameter of slightly less than about 0.25 inches and the flat wire wave spring will have a wire width of slightly less than about 0.25 inches. In this example, it is assumed that the respective diameter and width are each 0.25 inches. It is also assumed that the cross-sectional areas of the springs are the same. Therefore, over the same length of wave spring the same amount of material will be used in its manufacture. By holding these factors equal, a relevant comparison can be made between the moments of inertia as shown in the chart below.

| D or W diameter | A (in$^2$) | F$_{RW}$ (in$^4$) | t (in) | I$_{FW}$ | I$_{RW}$/I$_{FW}$ |
|---|---|---|---|---|---|
| 0.01 | 0.0000785 | 4.9 × 10$^{-10}$ | 0.00785 | 4.03114E – 10 | 1.217088 |
| 0.02 | 0.000314 | 7.85E – 09 | 0.0157 | 6.44982E – 09 | 1.217088 |
| 0.03 | 0.0007065 | 3.9 × 10$^{-10}$ | 0.02355 | 3.26522E – 08 | 1.217088 |
| 0.04 | 0.001256 | 1.2 × 10$^{-10}$ | 0.0314 | 1.03197E – 07 | 1.217088 |
| 0.05 | 0.0019625 |  | 0.03925 | 2.51946E – 07 | 1.217088 |
| 0.1 | 0.00785 | 4.90625E – 06 | 0.0785 | 4.03114E – 06 | 1.217088 |
| 0.2 | 0.0314 | 0.0000785 | 0.157 | 6.44982E – 05 | 1.217088 |
| 0.3 | 0.07065 | 0.000397406 | 0.2355 | 0.000326522 | 1.217088 |
| 0.4 | 0.1256 | 0.001256 | 0.314 | 0.001031971 | 1.217088 |
| 0.5 | 0.19625 | 0.003066406 | 0.3925 | 0.002519462 | 1.217088 |
| 1 | 0.785 | 0.0490625 | 0.785 | 0.040311385 | 1.217088 |
| 2 | 3.14 | 0.785 | 1.57 | 0.644982167 | 1.217088 |
| 3 | 7.065 | 3.9740625 | 2.355 | 3.265222219 | 1.217088 |
| 4 | 12.56 | 12.56 | 3.14 | 10.31971467 | 1.217088 |
| 5 | 19.625 | 30.6640625 | 3.925 | 25.19461589 | 1.217088 |
| 10 | 78.5 | 490.625 | 7.85 | 403.1138542 | 1.217088 | where

D=diameter of round wire section

W=width of flat wire section

A=area of flat wire cross-section

I$_{RW}$=moment of inertia for round wire cross-section

I$_{FX}$=moment of inertia for flat wire cross-section

I$_{RW}$/I$_{FW}$=Power factor—ratio of moment of inertia for round wire and flat wire cross-section By comparing the moments of inertia of the round wire and the flat wire sections, the moment of inertia of the round wire section is always greater than that of the flat wire section by a factor of about 1.22 when the same width and same cross-sectional area are used. These ratios indicate that the round wire section has a moment of inertia that is approximately 20% greater than that of a comparable flat wire section. This increase also means that the spring rate for the round wire section will be greater than the spring rate of a comparable flat wire section.

As mentioned above, one of the limiting factors when designing a compression spring for a specific application is the radial width in which the spring operates. Radial or width, as used herein is the distance in which the spring lies, i.e. between the two walls of a groove wall. If the radial width cannot be expanded by either moving work elements or reducing their size, the maximum width, of the spring is limited to the width of the radial space. The spring force for a wave spring in a given radial width is a limitation. The width of the spring simply cannot exceed the width of its cavity or groove. Therefore, a designer will design a spring that operates within the required parameters that is easy to manufacture and has a relatively low cost.

Other design factors for a wave spring are the number of waves, the spring diameter, the free height and the materials used. The embodiment shown in FIG. 6 shows a five wave spring 100 of the invention. The wave spring 100 has a plurality of crests 102 and troughs 104. The wave number is the number of waves in a circular extent of the spring, while the wave length is the distance or length between successive wave crests shown by the chord 144. The number of waves, the amplitude of the waves 112 and the wave length 144 are factors that are considered in designing the gap 106 of the spring 100. The two wire free ends 134 and 136 define a gap 106 with an intervening space therebetween occurring when the spring is in an unloaded state. It prevents the free ends 134 and 136 from touching as the wave spring 100 is compressed in operation to its compressed height. The maximum (and worst case) operating height that occurs when the spring is loaded and compressed by another work element, will typically equal the diameter of the wire used in the spring. Often spring users and designers will specify a solid height because they cannot exactly predict how far the extent of compression that will occur in actual use. A factor of safety is used that takes into account how far the free ends 134 and 136 will travel so that gap 106 is large enough so that ends 134 and 136 do not touch.

This intervening gap 106, is directly related to the length of the wire (i.e., the total circular extent) that makes up the spring. The length of the filament of wire in the spring is based upon the spring radius 108 and 110, the wave frequency of the waves formed in the spring, the wave amplitude 112 and the measurements of the spring seat opening 146 as shown in FIG. 5.

FIG. 7B shows a spring 100 of the invention in an unconfined environment. As the wave spring 100 is compressed, the spring reacts in a variety of ways. As it is compressed from its free height to its solid, or maximum operating height, the free ends 134, 136 will generally move toward each other so that the gap 106 decreases. Additionally, interior radius 108 and exterior radius 110 (FIG. 7B) will attempt to increase. The greater the potential deflection of the spring (a result of increasing the wave amplitude) or the smaller the wave frequency (increasing the number of waves decreases the waves frequency), the greater the growth in the interior radius 108 and exterior radius 110 as the spring is compressed. Since the gap 106 is present, the gap 106 decreases as the spring diameter increases. The result is a combined mechanical effect so that as the spring is deflected, both of the inner and outer radii grow and the gap decreases.

Most springs, however, are not positioned in an unconfined application. Often, the outside diameter is restricted within a cavity as shown in FIGS. 5, 8A, 8B, and 8C. As the inner and outer radii grow, the wave spring eventually contacts the outer wall 130, which prevents further radius growth of the wave spring 100 as it is further compressed. The inner and outer radii can no longer grow, and the gap decreases as a result. Designing in a factor of safety, designers realize that overlapping contact between the gap ends 134 and 136 may cause failure of the spring and/or the system, so they design a gap sufficiently large, so that ends 134 and 136 do not touch or overlap when the wave spring is compressed to its solid height and where the outside diameter of the wave spring is restrained to a given dimension.

Figure 5:
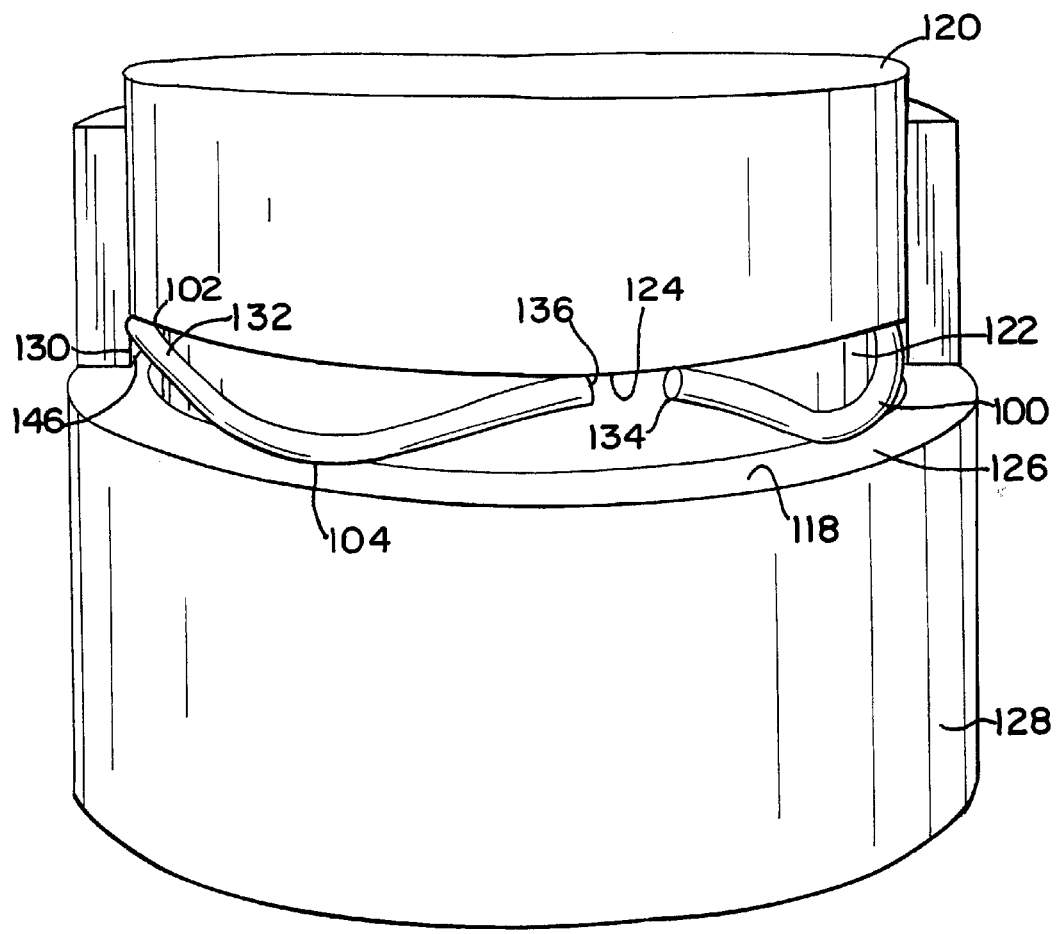
FIG. 5 is a partial cutaway perspective view of a work assembly having a round wire wave spring disposed in an annular groove on a cylindrical shaft.

Referring now to FIG. 5, which shows the round wire wave spring 100 in a working environment, the wave spring 100 is positioned in annular groove 122 formed in cylindrical shaft 120 and has a plurality of crests 102 and troughs 104. The crests 102 contact a first working surface 124 and the troughs 104 contact a working surface 118 which is part of the cylinder shoulder 126. The resulting effect is that shaft 120 has constrained axial movement with respect to cylinder 128 in a compressive direction. The wave spring 100 fits into a spring seat opening 146 which is bound on the top by the first working surface 124 or on the bottom by second working surface 118, and radially by outer groove wall 130 and inner groove wall 132. These surfaces cooperatively restrain the wave spring 100 in its radial movement; thus, free ends 134, 136 will generally move to close the gap 106 therebetween when the wave spring 100 is compressed.

Figure 8A:
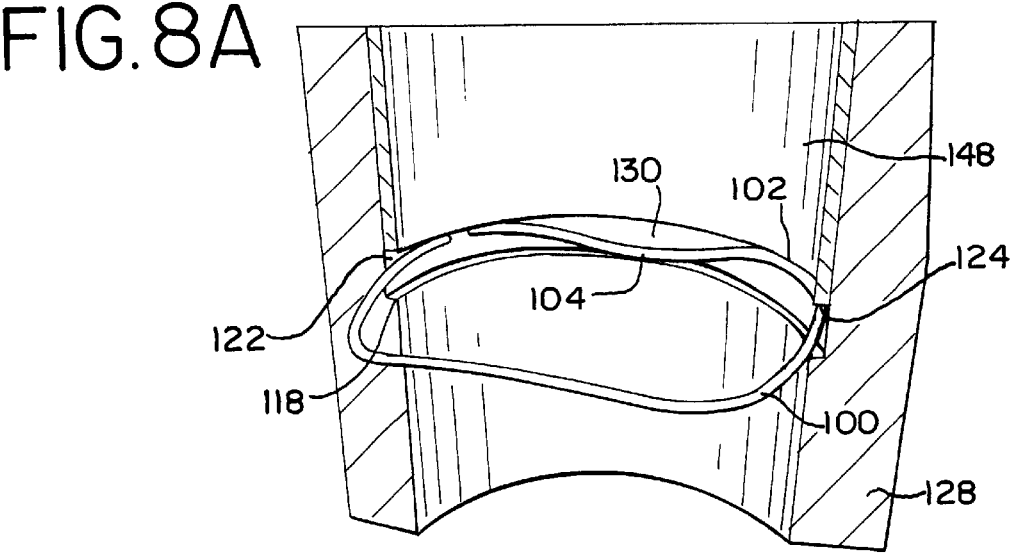
FIGS. 8A, 8B and 8C are cutaway views of wave springs of the present invention with different number of waves, but illustrated in a working environment.
Figure 8B:
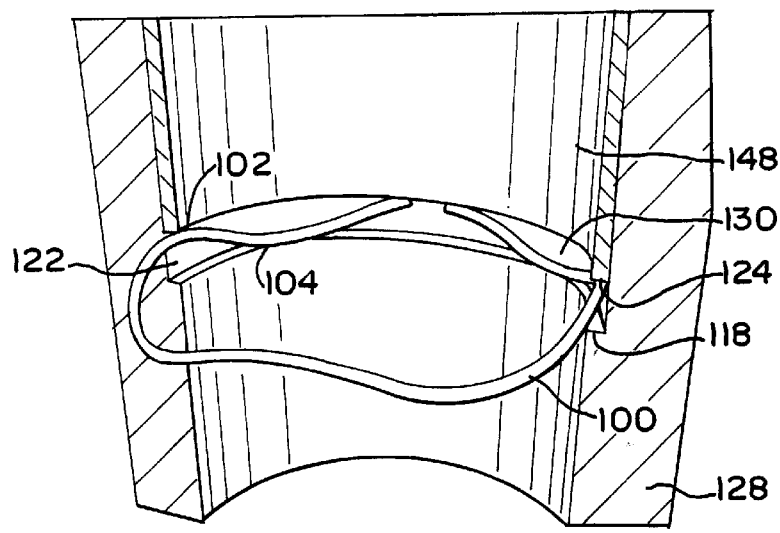
Figure 8C:
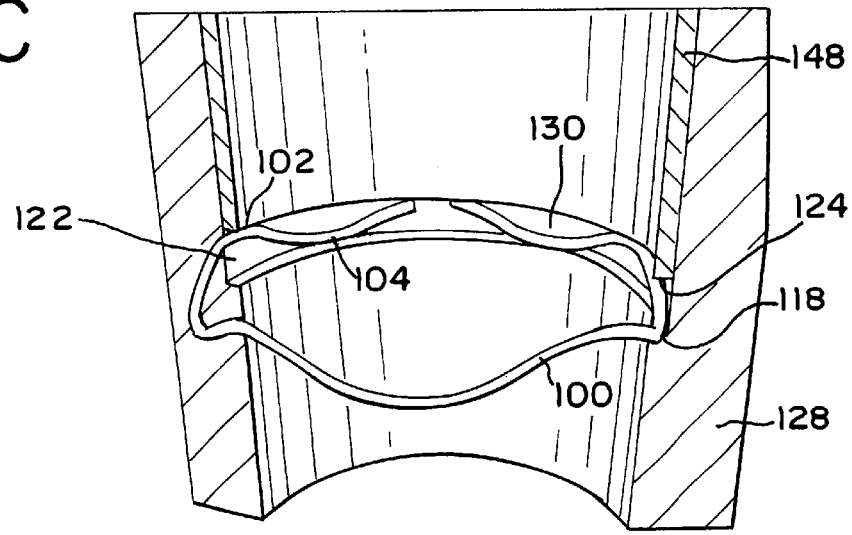

In another working environment, various embodiments of the invention as shown in FIGS. 8A–C, depict a round wire wave spring 100 resting in annular groove 122, formed by a first groove wall 124 of sleeve 148 and second groove wall 118 of cylinder 128. The outer groove wall 130 constrains round wire wave spring 100 so that the inner and outer radii of the wave spring 100 cannot expand. Therefore, the ends will close gap 106 under compression.

Figure 9A:
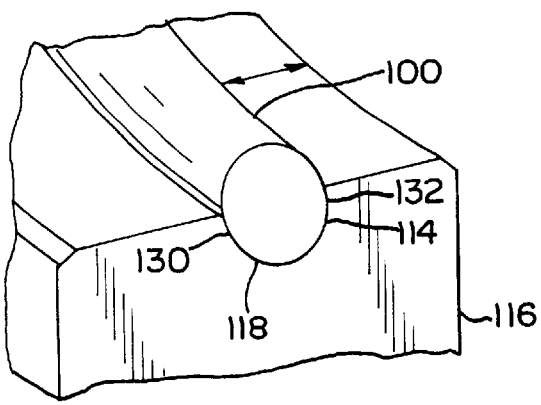
FIGS. 9A, 9B and 9C are enlarged detail views of waves springs of the present invention illustrated in place within a variety of different grooves on working elements; and, FIGS. 10A, 10B and 10C are elevational views of a variety of gaps between the ends of a round wire wave spring.
Figure 9B:
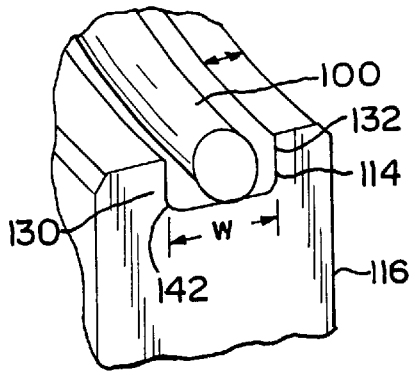
Figure 9C:
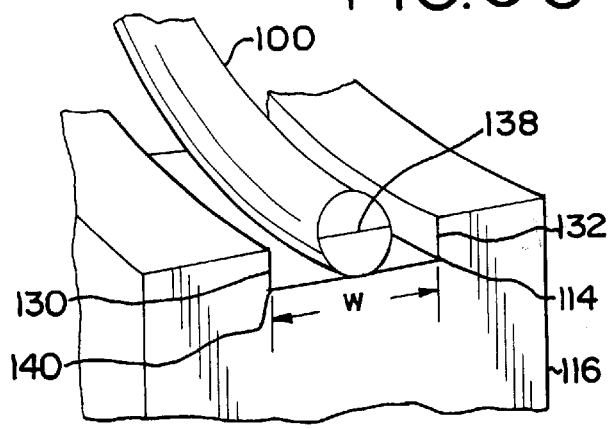

FIG. 3 shows a round wire wave spring 100 on cylinder 116 resting in an annular seat 114. This seat 114 can take on a variety of shapes as shown in FIGS. 9A–C. Annular seat 114 may be formed in cylinder 116 so that annular seat 114 has an outer groove wall 130, an inner groove wall 132, and a second working surface 118 onto which troughs 104 exert a spring force. Additionally, round wire wave spring 100 may be confined by a similar cylinder with an annular seat 114 positioned to accept crests 102.

When a conventional wave spring is used in an assembly, the spring must lie on a flat surface as shown in FIG. 1 in order to work efficiently. This flat surface is commonly formed at the bottom of annular seat 114 so that the wave spring is contained radially and cannot float about the operating surface. The annular seat 114 is designed with specific rectangular dimensions, which theoretically contain the spring and allow it to rest solidly on the flat surface. In addition, annular seat 114 is designed without sharp or square corners as shown in FIG. 9B in order to minimize stress concentration factors which are found in the square corners. Often, the tooling necessary to machine the annular seat 114 with a flat groove does not remain sharp and the annular seat 114 has partially square corners. If a flat wire wave spring were used in FIGS. a or 9B, the flat wire wave spring would tend to ride out of the annular seat 114. With the round wire wave spring 100, any of the annular seats 114 depicted in FIGS. a, 9B, and 9C may be used. The critical dimension is the width (W) of the annular seat 114. If W is greater than diameter 138 of round wire wave spring 100, round wire wave spring will be able to move radially within the groove.

As illustrated in FIG. 9C, the round wire wave spring 100 can operate in a rectangular shaped annular seat 114 just as a flat wire spring can. However, it is preferred that the annular seat 114 have rounded corners 142 as shown in FIG. 9B to diminish the stress concentrations that occur in sharp cornered channels. The natural circular cross-sectional shape of wave spring 100 will operate against the radius shape of the annular seat 114 and at the same time maintain the operating conditions of the wave spring as specified in the design. The preferred, radiused annular seat shown in FIGS. 9A and 9B avoids the stress concentrations which result from the square cornered, rectangular annular seat (shown in FIGS. 1 and 9C). Additionally, the radiused corner is easier to produce than a rectangular groove. The radius of the annular seat in which the round wire wave spring 100 will operate should be at least equal to or greater than the radius of the wire used to produce this wave spring. Additionally, the width of any groove should be greater than the diameter of the round wire wave spring 100.

In other embodiments of the invention as shown in FIGS. 8A, 8B, and 8C, the round wire wave spring has any number of waves formed thereon. As shown in the figures, three, four and five complete waves are preferred embodiments of the invention; however, this invention also includes all round wire wave springs including for example 2.5 waves, and 10.2 waves.

It will be appreciated that the embodiments of the present invention which have been discussed are merely illustrative of few of the applications of the principles of the invention. Numerous modifications may be made by those skilled in the art without departing from the free spirit and the scope of the invention.

What is claimed is:

1. An improved wave spring, comprising:
a spring having only a single turn, the single turn being formed from a length of round wire that is wound in a circle on a predetermined radius for an arc length of less than 360 degrees, the round wire length having a circular cross-sectional configuration for its entire arc length, said round wire length further terminating in two free ends which are separated from each other by an intervening gap, said round wire length further having a plurality of waves formed therein, each of the waves having opposing crest and trough portions defining respective first and second working surfaces on opposite surfaces of said wave spring for respectively contacting first and second working elements when said wave spring is used in a spring application, the first working surfaces being associated with said wave crests and said second working surfaces being associated with said wave troughs, said wave spring having a free height which is equal to the distance between said crests and troughs in the absence of loading of said wave spring, said intervening gap being of a length sufficiently large to permit said round wire length free ends to move toward each other when said wave spring is compressed from its undeflected free height to a lesser height in response to loading by either of said first and second working elements.

2. The wave spring of claim 1, wherein said waves define a substantially sinusoidal curve.

3. The wave spring of claim 1, wherein said waves define a substantially clothoidal curve.

4. The wave spring of claim 1, wherein said two free ends are axially aligned with each other along said round wire length.

5. The wave spring of claim 4, wherein said intervening gap is disposed on said round wire length between adjacent crests and troughs of one of said plurality of said waves.

6. The wave spring of claim 4, wherein said intervening gap is disposed on one of a crest or trough of one of said plurality of waves.

7. The wave spring of claim 4, wherein said two free ends are disposed proximate to a crest or trough of one of said waves and imaginary lines extending from said free ends intersect.

8. The wave spring of claim 4, wherein said round wire has a preselected radius that is substantially constant throughout said round wire length and said wave spring having a power factor that is approximately 20% greater than a single turn wave spring formed from flat wire having a radial width equal to said round wire diameter.

9. The wave spring of claim 1, wherein said crests and troughs are spaced approximately equidistant from each other.

10. A wave spring, comprising: a ring formed into approximately a single turn, the ring being formed from a length of round wire of circular cross-section and having two free ends so as to permit relative movement of said ring free ends during compression thereof, the approximate single turn having an arc length of less than 360 degrees, said circular cross-section being continuous throughout said arc length, said approximate single turn having at least three waves defined therein for engaging first and second working elements on opposite sides of said wave spring when said wave spring is used in a working application, said waves including successive crest and trough portions spaced equidistant from each other about a circumferential extent of said wave spring, said wave crest and trough portions including shoulder portions disposed thereon which abuttingly engage opposing surface of said first and second working elements when said wave spring is used in said work environment, said wave spring having an undeflected free height equal to the distance between successive wave crests and trough portions, said ring free ends nearing each other when a compressive force is applied to said ring by either of said first and second working elements.

11. The wave spring of claim 10, wherein said ring includes at least four waves with successive crest and trough portions.

12. The wave spring of claim 10, wherein said two free ends are disposed on said ring between two adjacent crest and trough portions.

13. The wave spring of claim 12, wherein said two free ends are axially aligned with each other.

14. The wave spring of claim 10, wherein said two free ends are disposed on said ring along one of said crest and trough portions.

15. The wave spring of claim 14, wherein said two free ends are axially aligned with each other.

16. The wave spring of claim 10, wherein said round wire has a preselected diameter and said ring has a power factor that is at least 20% greater than a comparable, single turn wave spring formed from flat wire of a radial width equal to said round wire diameter.

17. The wave spring of claim 10, wherein said waves define a substantially continuous sinusoidal curve.

18. The wave spring of claim 10, wherein said waves define a substantially continuous clothoidal curve.

19. A wave spring, comprising: a ring formed into approximately a single turn having an arc length of less than 360 degrees, the ring being formed from a length of round wire and having two free ends so as to permit relative movement of said ring free ends during compression thereof in a working environment between opposing first and second working surfaces, the approximate single turn having a plurality of waves defined therein for engaging first and second working elements on opposite sides of said wave spring when said wave spring is used in a working application, at least two of said waves including successive crests and trough portions spaced apart from each other about a circumferential extent of said wave spring, said wave crest and trough portions including shoulder portions disposed thereon which abuttingly engage opposing surface of said first and second working elements when said wave spring is used in said work environment, said wave spring having an undeflected free height equal to the distance between successive wave crests and trough portions, said ring free ends approaching each other when a compressive force is applied to said ring by either of said first and second working elements, said round wire having a preselected diameter that is substantially constant throughout its length, said ring having a power factor that is at least 20% greater than a comparable, single turn wave spring formed from flat wire of a thickness equal to said round wire diameter.

* * * * *